US00RE45041E

(19) United States
(12) Reissued Patent
Gerson

(10) Patent Number: US RE45,041 E
(45) Date of Reissued Patent: Jul. 22, 2014

(54) METHOD AND APPARATUS FOR THE PROVISION OF INFORMATION SIGNALS BASED UPON SPEECH RECOGNITION

(71) Applicant: Ira A. Gerson, Schaumburg, IL (US)

(72) Inventor: Ira A. Gerson, Schaumburg, IL (US)

(73) Assignee: BlackBerry Limited, Waterloo, Ontario (CA)

(21) Appl. No.: 13/891,262

(22) Filed: May 10, 2013

Related U.S. Patent Documents

Reissue of:
(64) Patent No.: 6,868,385
Issued: Mar. 15, 2005
Appl. No.: 09/412,119
Filed: Oct. 5, 1999

(51) Int. Cl.
*G10L 21/00* (2013.01)

(52) U.S. Cl.
USPC ..... 704/275; 704/201; 704/231; 704/251; 704/270.1; 379/88.04; 375/219; 370/468

(58) Field of Classification Search
USPC ..... 704/270.1, 275, 201, 251, 231, 270; 379/88.01–88.04; 375/219, 217; 370/468
See application file for complete search history.

(56) References Cited

U.S. PATENT DOCUMENTS

| | | | | |
|---|---|---|---|---|
| 4,914,692 | A | 4/1990 | Hartwell et al. | |
| 5,155,760 | A | 10/1992 | Johnson et al. | |
| 5,199,062 | A * | 3/1993 | Von Meister et al. | 379/88.04 |
| 5,475,791 | A | 12/1995 | Schalk et al. | |
| 5,652,789 | A | 7/1997 | Miner et al. | |
| 5,703,881 | A * | 12/1997 | Kay et al. | 370/468 |
| 5,708,704 | A | 1/1998 | Fisher | |
| 5,742,929 | A * | 4/1998 | Kallman et al. | 704/251 |
| 5,758,317 | A | 5/1998 | Peterson et al. | |
| 5,765,130 | A | 6/1998 | Nguyen | |
| 5,768,308 | A * | 6/1998 | Pon et al. | 375/219 |
| 5,774,859 | A * | 6/1998 | Houser et al. | 704/275 |
| 5,940,793 | A * | 8/1999 | Attwater et al. | 704/231 |
| 6,085,080 | A * | 7/2000 | Rahikainen et al. | 455/403 |
| 6,615,171 | B1 | 9/2003 | Kanevsky et al. | |
| 6,868,385 | B1 * | 3/2005 | Gerson | 704/275 |
| 2002/0173333 | A1 * | 11/2002 | Buchholz et al. | 455/527 |

OTHER PUBLICATIONS

Digalakis et al., "Quantization of Cepstral Parameters for Speech Recognition over the World Wide Web," IEEE Journal on Selected Areas in Communications, vol. 17, No. 1, Jan. 1999.

"The Aurora Project"; Foundation for Intelligent Physical Agents ("FIPA"); Chris Ellis; http://drogo.csell.stet.it/fipa/yorktown/ayws029.htm.

* cited by examiner

*Primary Examiner* — Vijay B Chawan
(74) *Attorney, Agent, or Firm* — Finnegan, Henderson, Farabow, Garrett & Dunner LLP

(57) ABSTRACT

A wireless comprises at least one subscriber unit in wireless communication with an infrastructure. Each subscriber unit implements a speech recognition client, and the infrastructure comprises a speech recognition server. A given subscriber unit takes as input an unencoded speech signal that is subsequently parameterized by the speech recognition client. The parameterized speech is then provided to the speech recognition server that, in turn, performs speech recognition analysis on the parameterized speech. Information signals, based in part upon any recognized utterances identified by the speech recognition analysis, are subsequently provided to the subscriber unit. The information signals may be used to control the subscriber unit itself; to control one or more devices coupled to the subscriber unit, or may be operated upon by the subscriber unit or devices coupled thereto.

38 Claims, 6 Drawing Sheets

METHOD AND APPARATUS FOR THE PROVISION OF INFORMATION SIGNALS BASED UPON SPEECH RECOGNITION

Matter enclosed in heavy brackets [ ] appears in the original patent but forms no part of this reissue specification; matter printed in italics indicates the additions made by reissue.

*The present application, Reissue application Ser. No. 13/891,262 filed on May 10, 2013, is a reissue application Ser. No. 09/412,119 filed on Oct. 5, 1999, of U.S. Pat. No. 6,868,385. Reissue application Ser. No. 13/891,273, filed on May 10, 2013, is a continuation of the present reissue application.*

TECHNICAL FIELD

The present invention relates generally to communication systems incorporating speech recognition and, in particular, to the provision of information signals to subscriber units and/or accompanying devices based upon speech recognition analysis.

BACKGROUND OF THE INVENTION

Speech recognition systems are generally known in the art, particularly in relation to telephony systems. U.S. Pat. Nos. 4,914,592; 5,475,791; 5,708,704; and 5,765,130 illustrate exemplary telephone networks that incorporate speech recognition systems. A common feature of such systems is that the speech recognition element (i.e., the device or devices performing speech recognition) is typically centrally located within the fabric of the telephone network, as opposed to at the subscriber's communication device (i.e., the user's telephone). In a typical application, a combination of speech synthesis and speech recognition elements is deployed within a telephone network or infrastructure. Callers may access the system and, via the speech synthesis element, be presented with informational prompts or queries in the form of synthesized speech. A caller will typically provide a spoken response to the synthesized speech and the speech recognition element will process the caller's spoken response in order to provide further service to the caller.

Although a substantial body of prior art exists regarding systems such as those described above, the incorporation of speech recognition systems into wireless communication systems is a relatively new development. In an effort to standardize the application of speech recognition in wireless communication environments, work has recently been initiated be the European Telecommunications Standards Institute (ETSI) on the so-called Aurora Project. A goal of the Aurora Project is to define a global standard for distributed speech recognition systems. Generally, the Aurora Project is proposing to establish a client-server arrangement in which front-end speech recognition processing, such as feature extraction or parameterization, is performed within a subscriber unit (e.g., a handheld wireless communication device such as a cellular telephone). The data provided by the front-end would then be conveyed to a server to perform back-end speech recognition processing.

It is anticipated that the client-server arrangement being proposed by the Aurora Project will adequately address the needs for a distributed speech recognition system. However, it is uncertain at this time what features and services the Aurora Project will enable. For example, efforts are currently under way to develop so-called telematics systems. Telematics systems may be broadly defined to include any technology concerning the delivery of information-based services to users and their devices in their vehicles. However, there does not appear to be any significant solutions defining how speech recognition technology can be incorporated into telematics systems. Thus, it would be advantageous to provide a technique incorporating speech recognition technology into telematics systems, as well as other systems, in order to enable various services.

SUMMARY OF THE INVENTION

The present invention provides a technique, principally applicable to wireless communication environments, for providing information to subscriber units based on speech recognition processing. In general, a wireless system in accordance with the present invention comprises at least one subscriber unit in wireless communication with an infrastructure. Preferably, each subscriber unit implements a speech recognition client, whereas the infrastructure comprises a speech recognition server. A given subscriber unit takes as input an unencoded speech signal that is subsequently parameterized by the speech recognition client. The parameterized speech is then provided to the speech recognition server which, in turn, performs speech recognition analysis on the parameterized speech. Information signals, based in part upon any recognized utterances identified by the speech recognition analysis, are subsequently provided to the subscriber unit. The information signals may comprise control signals used to control the subscriber unit itself or to control one or more devices coupled to the subscriber unit. Alternatively, the information signals may comprise data signals to be operated upon by the subscriber unit itself or devices coupled to the subscriber unit. Such data signals can be used to locally develop control signals, or may lead to the provision of additional user data to the speech recognition server which, in turn can respond with additional information signals as described above. In this manner, the present invention provides a technique for enabling services in wireless subscriber units based in part upon a client-server speech recognition model.

DETAILED DESCRIPTION OF THE PREFERRED EMBODIMENT

Figure 1:
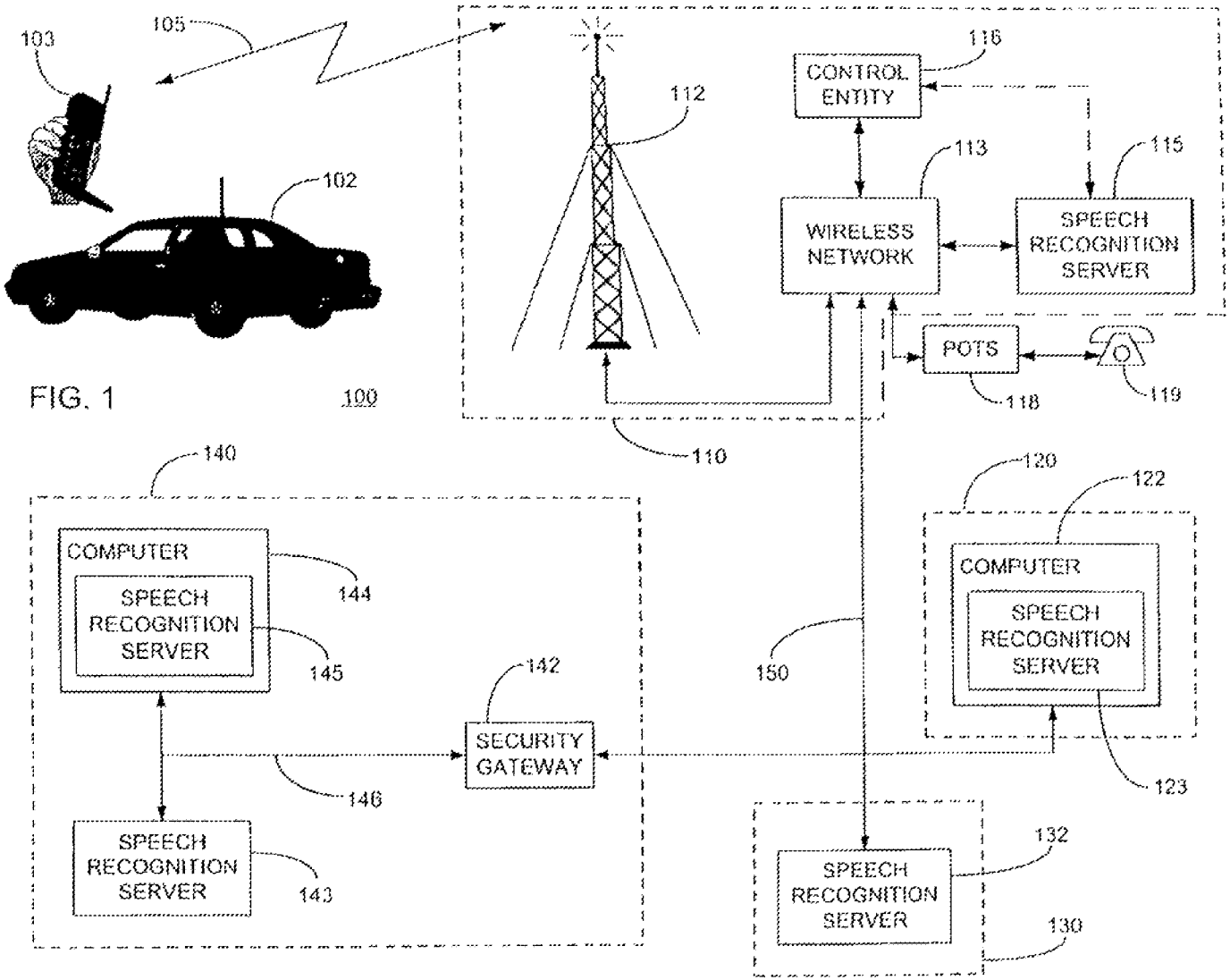
FIG. 1 is a block diagram of a wireless communications system in accordance with the present invention.

The present invention may be more fully described with reference to FIGS. 1-7. FIG. 1 illustrates the overall system architecture of a wireless communication system 100 comprising subscriber units 102-103. The subscriber units 102-103 communicate with an infrastructure via a wireless channel 105 supported by a wireless system 110. The infrastructure of the present invention may comprise, in addition to the wireless system 110, any of a small entity system 120, a content provider system 130 and an enterprise system 140 coupled together via a data network 150.

The subscriber units may comprise any wireless communication device, such as a handheld cellphone 103 or a wireless communication device residing in a vehicle 102, capable of communicating with a communication infrastructure. It is understood that a variety of subscriber units, other than those shown in FIG. 1, could be used; the present invention is not limited in this regard. The subscriber units 102-103 preferably include the components of a hands-free cellular phone, for hands-free voice communication, a local speech recognition and synthesis system, and the client portion of a client-server speech recognition and synthesis system. These components are described in greater detail below with respect to FIGS. 2 and 3.

The subscriber units 102-103 wirelessly communicate with the wireless system 110 via the wireless channel 105. The wireless system preferably comprises a cellular system, although those having ordinary skill in the art will recognize that the present invention may be beneficially applied to other types of wireless systems supporting voice communications. The wireless channel 105 is typically a radio frequency (RF) carrier implementing digital transmission techniques and capable of conveying speech and/or data both to and from the subscriber units 102-103. It is understood that other transmission techniques, such as analog techniques, may also be used. In a preferred embodiment, the wireless channel 105 is a wireless packet data channel, such as the General Packet Data Radio Service. (GPRS) defined by the European Telecommunications Standards Institute (ETSI). The wireless channel 105 transports data to facilitate communication between a client portion of the client-server speech recognition and synthesis system, and the server portion of the client server speech recognition and synthesis system. Other information, such as display, control, location, or status information can also be transported across the wireless channel 105.

The wireless system 110 comprises an antenna 112 that receives transmissions conveyed by the wireless channel 105 from the subscriber units 102-103. The antenna 112 also transmits to the subscriber units 102-103 via the wireless channel 105. Data received via the antenna 112 is converted to a data signal and transported to the wireless network 113. Conversely, data from the wireless network 113 is sent to the antenna 112 for transmission. In the context of the present invention, the wireless network 113 comprises those devices necessary to implement a wireless system, such as base stations, controllers, resource allocators, interfaces, databases, etc. as generally known in the art. As those having ordinary skill the art will appreciate, the particular elements incorporated into the wireless network 113 is dependent upon the particular type of wireless system 110 used, e.g., a cellular system, a trunked land mobile system, etc.

A speech recognition server 115 providing a server portion of a client-server speech recognition and synthesis system may be coupled to the wireless network 113 thereby allowing an operator of the wireless system 110 to provide speech-based services to users of the subscriber units 102-103. A control entity 116 may also be coupled to the wireless network 113. The control entity 116 can be used to send control signals, responsive to input provided by the speech recognition server 115, to the subscriber units 102-103 to control the subscriber units or devices interconnected to the subscriber units. As shown, the control entity 116, which may comprise any suitably programmed general purpose computer, may be coupled to the speech recognition server 115 either through the wireless network 113 or directly, as shown by the dashed interconnection.

As noted above, the infrastructure of the present invention can comprise a variety of systems 110, 120, 130, 140 coupled together via a data network 150. A suitable data network 150 may comprise a private data network using known network technologies, a public network such as the Internet, or a combination thereof. As alternatives, or in addition to, the speech recognition server 115 within the wireless system 110, remote speech recognition servers 123, 132, 143, 145 may be connected in various ways to the data network 150 to provide speech-based services to the subscriber units 102-103. The remote speech recognition servers, when provided, are similarly capable of communicating to with the control entity 116 through the data network 150 and any intervening communication paths.

A computer 122, such as a desktop personal computer or other general-purpose processing device, within a small entity system 120 (such as a small business or home) can be used to implement a speech recognition server 123. Data to and from the subscriber units 102-103 is routed through the wireless system 110 and the data network 150 to the computer 122. Executing stored software algorithms and processes, the computer 122 provides the functionality of the speech recognition server 123, which, in the preferred embodiment, includes the server portions of both a speech recognition system and a speech synthesis system. Where, for example, the computer 122 is a user's personal computer, the speech recognition server software on the computer can be coupled to the user's personal information residing on the computer, such as the user's email, telephone book, calendar, or other information. This configuration would allow the user of a subscriber unit to access personal information on their personal computer utilizing a voice-based interface. The client portions of the client-server speech recognition and speech synthesis systems in accordance with the present invention are described in conjunction with FIGS. 2 and 3 below. The server portions of the client-server speech recognition and speech synthesis systems in accordance with the present invention are described in conjunction with FIGS. 4 and 5 below.

Alternatively, a content provider 130, which has information it would like to make available to users of subscriber units, can connect a speech recognition server 132 to the data network. Offered as a feature or special service, the speech recognition server 132 provides a voice-based interface to users of subscriber units desiring access to the content provider's information (not shown).

Another possible location for a speech recognition server is within an enterprise 140, such as a large corporation or similar entity. The enterprise's internal network 146, such as an Intranet, is connected to the data network 150 via security gateway 142. The security gateway 142 provides, in conjunction with the subscriber units, secure access to the enterprise's internal network 146. As known in the art, the secure access provided in this manner typically rely, in part, upon authentication and encryption technologies. In this manner, secure communications between subscriber units and an internal network 146 via an unsecured data network 150 are provided. Within the enterprise 140, server software implementing a speech recognition server 145 can be provided on a personal computer 144, such as a given employee's workstation. Similar to the configuration described above for use in small entity systems, the workstation approach allows an employee to access work-related or other information through a voice-based interface. Also, similar to the content provider 130 model, the enterprise 140 can provide an internally available speech recognition server 143 to provide access to enterprise databases.

Regardless of where the speech recognition servers of the present invention are deployed, they can be used to implement a variety of speech-based services. For example, operating in conjunction with the control entity 116, when provided, the speech recognition servers enable operational control of subscriber units or devices coupled to the subscriber units. It should be noted that the term speech recognition server, as used throughout this description, is intended to include speech synthesis functionality as well.

The infrastructure of the present invention also provides interconnections between the subscriber units 102-103 and normal telephony systems. This is illustrated in FIG. 1 by the coupling of the wireless network 113 to a POTS (plain old telephone system) network 118. As known in the art, the POTS network 118, or similar telephone network, provides communication access to a plurality of calling stations 119, such as landline telephone handsets or other wireless devices. In this manner, a user of a subscriber unit 102-103 can carry on voice communications with another user of a calling station 119.

Figure 2:
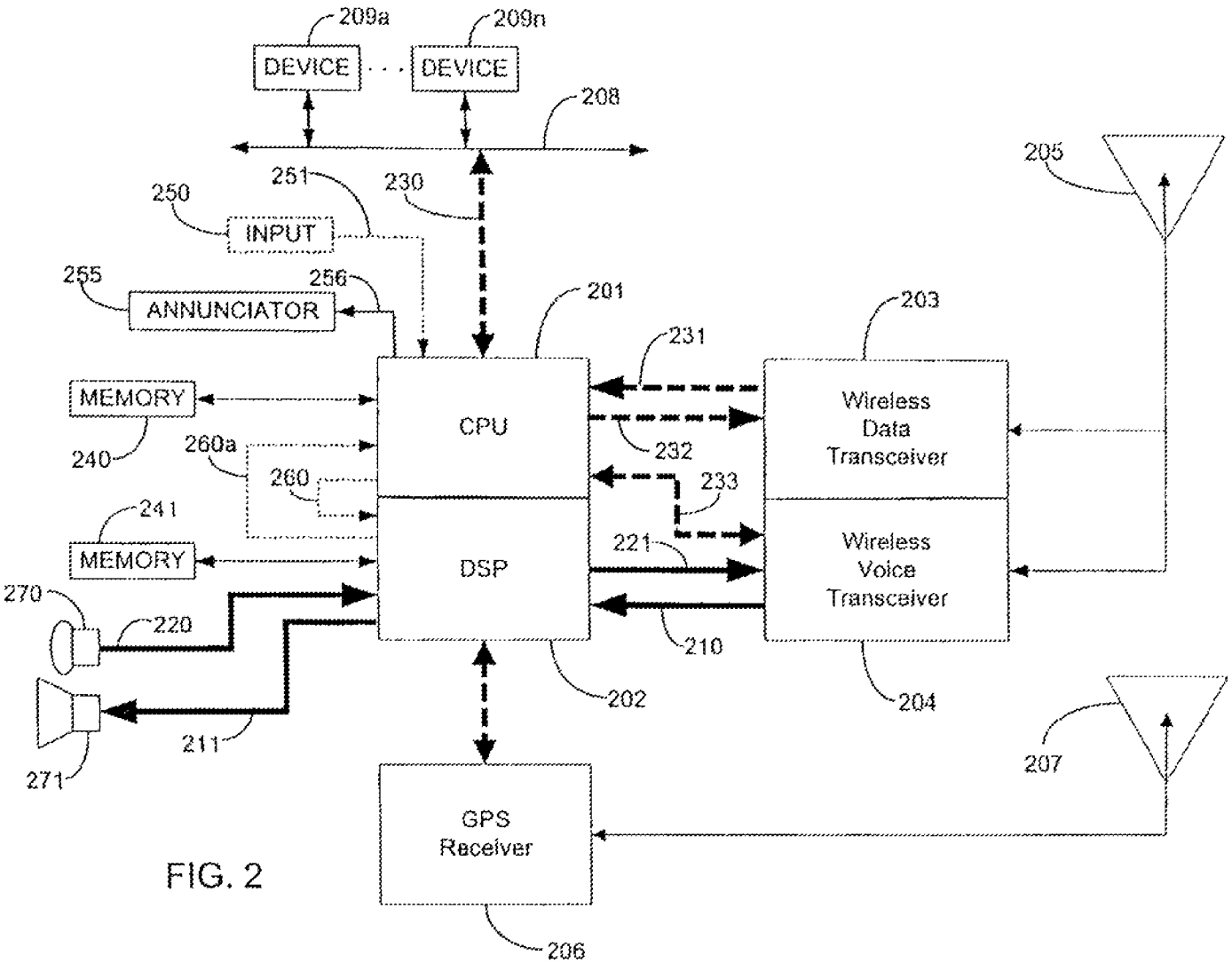
FIG. 2 is a block diagram of a subscriber unit in accordance with the present invention.

FIG. 2 illustrates a hardware architecture that may be used to implement a subscriber unit in accordance with the present invention. As shown, two wireless transceivers may be used: a wireless data transceiver 203, and a wireless voice transceiver 204. As known in the art, these transceivers may be combined into a single transceiver that can perform both data and voice functions. The wireless data transceiver 203 and the wireless speech transceiver 204 are both connected to an antenna 205. Alternatively, separate antennas for each transceiver may also be used. The wireless voice transceiver 204 performs all necessary signal processing, protocol termination, modulation/demodulation, etc. to provide wireless voice communication and in the preferred embodiment, comprises a cellular transceiver, In a similar manner, the wireless data transceiver 203 provides data connectivity with the infrastructure. In a preferred embodiment, the wireless data transceiver 203 supports wireless packet data, such as the General Packet Data Radio Service (GPRS) defined by the European Telecommunications Standards Institute (ETSI).

It is anticipated that the present invention can be applied with particular advantage to in-vehicle systems, as discussed below. When employed in-vehicle, a subscriber unit in accordance with the present invention also includes processing components that would generally be considered part of the vehicle and not part of the subscriber unit. For the purposes of describing the instant invention, it is assumed that such processing components are part of the subscriber unit. It is understood that an actual implementation of a subscriber unit may or may not include such processing components as dictated by design considerations. In a preferred embodiment, the processing components comprise a general-purpose processor (CPU) 201, such as a "POWER PC" by IBM Corp., and a digital signal processor (DSP) 202, such as a DSP56300 series processor by Motorola Inc. The CPU 201 and the DSP 202 are shown in contiguous fashion in FIG. 2 to illustrate that they are coupled together via data and address buses, as well as other control connections, as known in the art. Alternative embodiments could combine the functions for both the CPU 201 and the DSP 202 into a single processor or split them into several processors. Both the CPU 201 and the DSP 202 are coupled to a respective memory 240, 241 that provides program and data storage for its associated processor. Using stored software routines, the CPU 201 and/or the DSP 202 can be programmed to implement at least a portion of the functionality of the present invention. Software functions of the CPU 201 and DSP 202 will be described, at least in part, with regard to FIGS. 3 and 7 below.

In a preferred embodiment, subscriber units also include a global positioning satellite (GPS) receiver 206 coupled to an antenna 207. The GPS receiver 206 is coupled to the DSP 202 to provide received GPS information. The DSP 202 takes information from GPS receiver 206 and computes location coordinates of the wireless communications device. Alternatively the GPS receiver 206 may provide location information directly to the CPU 201.

Various inputs and outputs of the CPU 201 and DSP 202 are illustrated in FIG. 2. As shown in FIG. 2, the heavy solid lines correspond to voice-related information, and the heavy dashed lines correspond to control/data-related information. Optional elements and signal paths are illustrated using dotted lines. The DSP 202 receives microphone audio 220 from a microphone 270 that provides voice input for both telephone (cellphone) conversations and voice input to both a local speech recognizer and a client-side portion of a client-server speech recognizer, as described in further detail below. The DSP 202 is also coupled to output audio 211 which is directed to at least one speaker 271 that provides voice output for telephone (cellphone) conversations and voice output from both a local speech synthesizer and a client-side portion of a client-server speech synthesizer. Note that the microphone 270 and the speaker 271 may be proximally located together, as in a handheld device, or may be distally located relative to each other, as in an automotive application having a visor-mounted microphone and a dash or door-mounted speaker.

In one embodiment of the present invention, the CPU 201 is coupled through a bi-directional interface 230 to an in-vehicle data bus 208. This data bus 208 allows control and stains information to be communicated between various devices 209a-n in the vehicle, such as a cellphone, entertainment system, climate control system, etc, and the CPU 201. It is expected that a suitable data bus 208 will be an ITS Data Bus (IDB) currently in the process of being standardized by the Society of Automotive Engineers. Alternative means of communicating control and status information between various devices may be used such as the short-range, wireless data communication system being defined by the Bluetooth Special Interest Group (SIG). The data bus 208 allows the CPU 201 to control the devices 209 on the vehicle data bus in response to voice commands recognized either by a local speech recognizer or the client-server speech recognizer.

CPU 201 is coupled to the wireless data transceiver 203 via a receive data connection 231 and a transmit data connection 232. These connections 231-232 allow the CPU 201 to receive control information and speech-synthesis information sent from the wireless system 110. The speech-synthesis information is received from a server portion of a client-server speech synthesis system via the wireless data channel 105. The CPU 201 decodes the speech-synthesis information that is then delivered to the DSP 202. The DSP 202 then synthesizes the output speech and delivers it to the audio output 211. Any control information received via the receive data connection 231 may be used to control operation of the subscriber unit itself or sent to one or more of the devices in order to control their operation. Additionally, the CPU 201 can send status information, and the output data from the client portion of the client-server speech recognition system, to the wireless system 110. The client portion of the client-server speech recognition system is preferably implemented in software in the DSP 202 and the CPU 201, as described in greater detail below. When supporting speech recognition, the DSP 202 receives speech from the microphone input 220 and processes this audio to provide a parameterized speech signal to the CPU 201. The CPU 201 encodes the parameterized speech signal and sends this information to the wireless data transceiver 203 via the transmit data connection 232 to be sent over the wireless data channel 105 to a speech recognition server in the infrastructure.

The wireless voice transceiver 204 is coupled to the CPU 201 via a bi-directional data bus 233. This data bus allows the CPU 201 to control the operation of the wireless voice transceiver 204 and receive status information from the wireless voice transceiver 204. The wireless voice transceiver 204 is also coupled to the DSP 202 via a transmit audio connection 221 and a receive audio connection 210. When the wireless voice transceiver 204 is being used to facilitate a telephone (cellular) call, audio is received from the microphone input 220 by the DSP 202. The microphone audio is processed (e.g., filtered, compressed, etc.) and provided to the wireless voice transceiver 204 to be transmitted to the cellular infrastructure. Conversely, audio received by wireless voice transceiver 204 is sent via the receive audio connection 210 to the DSP 202 where the audio is processed (e.g., decompressed, filtered, etc.) and provided to the speaker output 211. The processing performed by the DSP 202 will be described in greater detail with regard to FIG. 3.

The subscriber unit illustrated in FIG. 2 may optionally comprise an input device 250 for use in manually providing an interrupt indicator 251 during a voice communication. That is, during a voice conversation, a user of the subscriber unit can manually activate the input device to provide an interrupt indicator, thereby signaling the user's desire to wake up speech recognition functionality. For example, during a voice communication, the user of the subscriber unit may wish to interrupt the conversation in order to provide speech-based commands to an electronic attendant, e.g., to dial up and add a third party to the call. The input device 250 may comprise virtually any type of user-activated input mechanism, particular examples of which include a single or multipurpose button, a multi-position selector or a menu-driven display with input capabilities. Alternatively, the input device 250 may be connected to the CPU 201 via the bi-directional interface 230 and the in-vehicle data bus 208. Regardless, when such an input device 250 is provided, the CPU 201 acts as a detector to identify the occurrence of the interrupt indicator. When the CPU 201 acts as a detector for the input device 250, the CPU 201 indicates the presence of the interrupt indicator to the DSP 202, as illustrated by the signal path identified by the reference numeral 260. Conversely, another implementation uses a local speech recognizer (preferably implemented within the DSP 202 and/or CPU 201) coupled to a detector application to provide the interrupt indicator. In that case, either the CPU 201 or the DSP 202 would signal the presence of the interrupt indicator, as represented by the signal path identified by the reference numeral 260a. Regardless, once the presence of the interrupt indicator has been detected, a portion of a speech recognition element (preferably the client portion implemented in conjunction with or as part of the subscriber unit) is activated to begin processing voice based commands. Additionally, an indication that the portion of the speech recognition element has been activated may also be provided to the user and to a speech recognition server. In a preferred embodiment, such an indication is conveyed via the transmit data connection 232 to the wireless data transceiver 203 for transmission to a speech recognition server cooperating with the speech recognition client to provide the speech recognition element.

Finally, the subscriber unit is preferably equipped with an annunciator 235 for providing an indication to a user of the subscriber unit in response to annunciator control 256 that the speech recognition functionality has been activated in response to the interrupts indicator. The annunciator 255 is activated in response to the detection of the interrupt indicator, and may comprise a speaker used to provide an audible indication, such as a limited-duration tone or beep. (Again, the presence of the interrupt indicator can be signaled using either the input device-based signal 260 or the speech-based signal 260a.) In another implementation, the functionality of the annunciator is provided via a software program executed by the DSP 202 that directs audio to the speaker output 211. The speaker may be separate from or the same as the speaker 271 used to render the audio output 211 audible. Alternatively, the annunciator 255 may comprise a display device, such as an LED or LCD display, that provides a visual indicator. The particular form of the annunciator 255 is a matter of design choice, and the present invention need not be limited in this regard. Further still, the annunciator 255 may be connected to the CPU 201 via the bi-directional interface 230 and the in-vehicle data bus 208.

Figure 3:
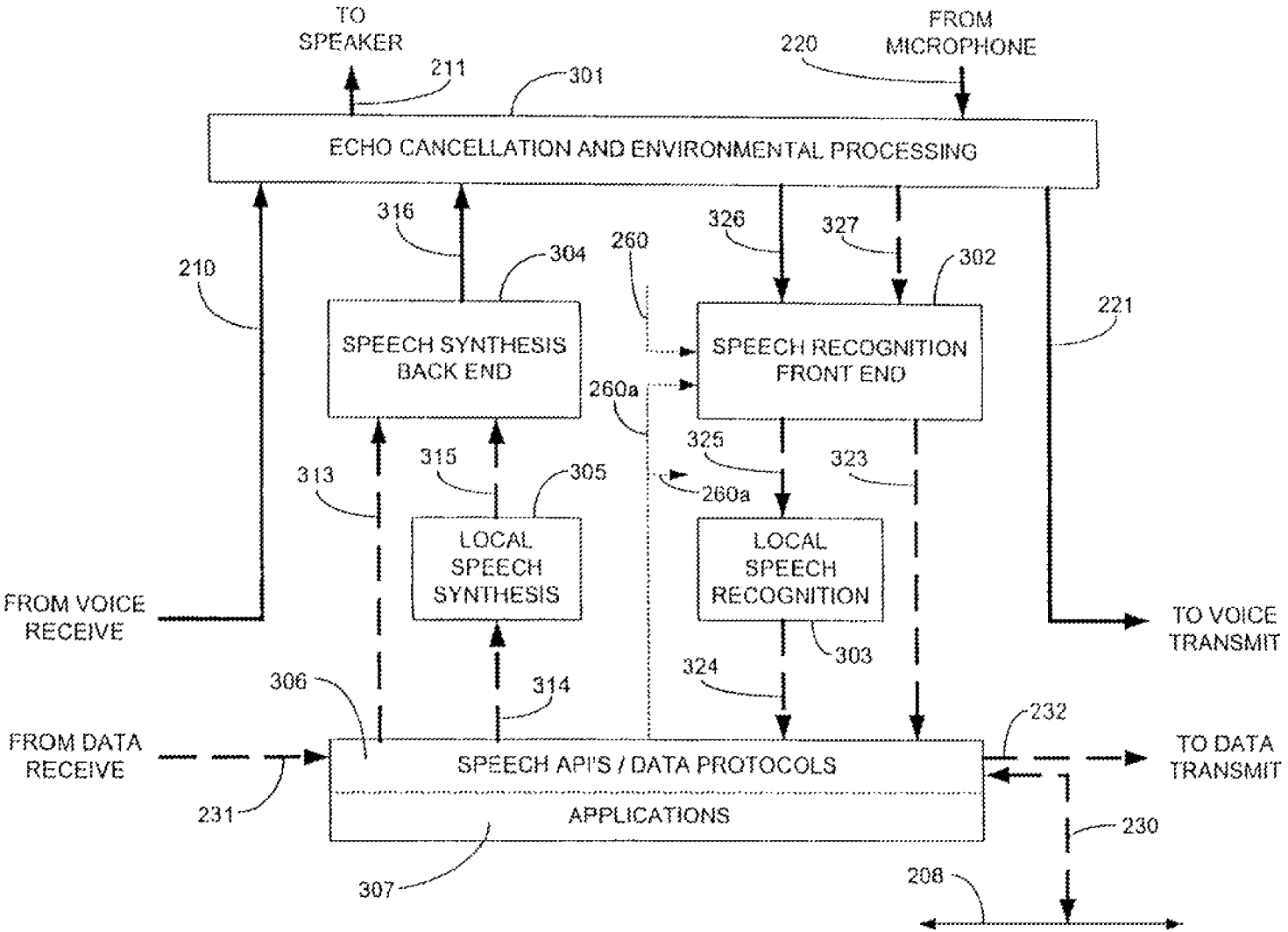
FIG. 3 is a schematic illustration of voice and data processing functionality within a subscriber unit in accordance with the present invention.

Referring now to FIG. 3, a portion of the processing performed within subscriber units (operating in accordance with the present invention) is schematically illustrated. Preferably, the processing illustrated in FIG. 3 is implemented using stored, machine-readable instructions executed by the CPU 201 and/or the DSP 202. The discussion presented below describes the operation of a subscriber unit deployed within an automotive vehicle. However, the functionality generally illustrated in FIG. 3 and described herein is equally applicable to non-vehicle-based applications that use, or could benefit from the use of, speech recognition.

Microphone audio 220 is provided as an input to the subscriber unit. In an automotive environment, the microphone would be a hands-free microphone typically mounted on or near the visor or steering column of the vehicle. Preferably, the microphone audio 220 arrives at the echo cancellation and environmental processing (ECEP) block 301 in digital form. The speaker audio 211 is delivered to the speaker(s) by the ECEP block 301 after undergoing any necessary processing. In a vehicle, such speakers can be mounted under the dashboard. Alternatively, the speaker audio 211 can be routed through an in-vehicle entertainment system to be played through the entertainment system's speaker system. The speaker audio 211 is preferably in a digital format. When a cellular phone call, for example, is in progress, received audio from the cellular phone arrives at the ECEP block 301 via the receive audio connection 210. Likewise, transmit audio is delivered to the cell phone over the transmit audio connection 221.

The ECEP block 301 provides echo cancellation of speaker audio 211 from the microphone audio 220 before delivery, via the transmit audio connection 221, to the wireless voice transceiver 204. This form of echo cancellation is known as acoustic echo cancellation and is well known in the art. For example, U.S. Pat. No. 5,136,599 issued to Amano et al. and titled "Sub-band Acoustic Echo Canceller", and U.S. Pat. No. 5,561,668 issued to Genter and entitled "Echo Canceler with Subband Attenuation and Noise Injection Control" teach suitable techniques for performing acoustic echo cancellation, the teachings of which patents are hereby incorporated by this reference.

The ECEP block 301 also provides, in addition to echo-cancellation, environmental processing to the microphone audio 220 in order to provide a more pleasant voice signal to the party receiving the audio transmitted by the subscriber unit. One technique that is commonly used is called noise suppression. The hands-free microphone in a vehicle will typically pick up many types of acoustic noise that will be heard by the other party. This technique reduces the perceived background noise that the other party hears and is described, for example, in U.S. Pat. No. 4,811,404 issued to Vilmur et al., the teachings of which patent are hereby incorporated by this reference.

The ECEP block 301 also provides echo-cancellation processing of synthesized speech provided by the speech-synthesis back end 304 via a first audio path 316, which synthesized speech is to be delivered to the speaker(s) via the audio output 211. As in the case with received voice routed to the speaker(s), the speaker audio "echo" which arrives on the microphone audio path 220 is cancelled out. This allows speaker audio that is acoustically coupled to the microphone, to be eliminated from the microphone audio before being delivered to the speech recognition front end 302. This type of processing enables what is known in the art as "barge-in". Barge-in allows a speech recognition system to respond to input speech while output speech is simultaneously being generated by the system. Examples of "barge-in" implementations can be found, for example, in U.S. Pat. Nos. 4,914,692; 5,475,791; 5,708,704; and 5,765,130.

Echo-cancelled microphone audio is supplied to a speech recognition front end 302 via a second audio path 326 whenever speech recognition processing is being performed. Optionally, ECEP block 301 provides background noise information to the speech recognition front end 302 via a first data path 327. This background noise information can be used to improve recognition performance for speech recognition systems operating in noisy environments. A suitable technique for performing such processing is described in U.S. Pat. No. 4,918,732 issued to Gerson et al., the teachings of which patent are hereby incorporated by this reference.

Based on the echo-cancelled microphone audio and, optionally, the background noise information received from the ECEP block 301, the speech recognition front-end 302 generates parameterized speech information. Together, the speech recognition front-end 302 and the speech synthesis back-end 304 provide the core functionality of a client-side portion of a client-server based speech recognition and synthesis system. Parameterized speech information is typically in the form of feature vectors, where a new vector is computed every 10 to 20 msec. One commonly used technique for the parameterization of a speech signal is mel cepstra as described by Davis et al. in "Comparison Of Parametric Representations For Monosyllabic Word Recognition In Continuously Spoken Sentences," IEEE Transactions on Acoustics Speech and Signal Processing, ASSP-28 (4), pp. 357-360, August 1980, the teachings of which publication are hereby incorporated by this reference.

The parameter vectors computed by the speech recognition front-end 302 are passed to a local speech recognition block 303 via a second data path 325 for local speech recognition processing. The parameter vectors are also optionally passed, via a third data path 323, to a protocol processing block 306 comprising speech application protocol interfaces (API's) and data protocols. In accordance with known techniques, the processing block 306 sends the parameter vectors to the wireless data transceiver 203 via the transmit data connection 232. In turn, the wireless data transceiver 203 conveys the parameter vectors to a server functioning as a part of the client-server based speech recognizer. While a single speech recognition front-end 302 is shown, the local speech recognizer 303 and the client-server based speech recognizer may in fact utilize different speech recognition front-ends.

The local speech recognizer 303 receives the parameter vectors 325 from the speech recognition front-end 302 and performs speech recognition analysis thereon, for example, to determine whether there are any recognizable utterances within the parameterized speech. In one embodiment, the recognized utterances (typically, words) are sent from the local speech recognizer 303 to the protocol processing block 306 via a fourth data path 324, which in turn passes the recognized utterances to various applications 307 for further processing. The applications 307, which may be implemented using either or both of the CPU 201 and DSP 202, can include a detector application that, based on recognized utterances, ascertains that a speech-based interrupt indicator has been received. For example, the detector compares the recognized utterances against a list of predetermined utterances (e.g., "wake up") searching for a match. When a match is detected, the detector application issues a signal 260a signifying the presence of the interrupt indicator. The presence of the interrupt indicator, in turn, is used to activate a portion of speech recognition element to begin processing voice-based commands. This is schematically illustrated in FIG. 3 by the signal 260a being fed to the speech recognition front end. In response, the speech recognition front end 302 would either continue routing parameterized audio to the local speech recognizer or, preferably, to the protocol processing block 306 for transmission to a speech recognition server for additional processing. (Note also that the input device-based signal 260, optionally provided by the input device 250, may also serve the same function.) Additionally, the presence of the interrupt indicator may be sent to transmit data connection 232 to alert an infrastructure-based element of a speech recognizer.

The speech synthesis back end 304 takes as input a parametric representation of speech and converts the parametric representation to a speech signal which is then delivered to ECEP block 301 via the first audio path 316. The particular parametric representation used is a matter of design choice. One commonly used parametric representation is formant parameters as described in Klatt, "Software For A Cascade/Parallel Formant Synthesizer", Journal of the Acoustical Society of America, Vol. 67, 1980, pp. 971-995. Linear prediction parameters are another commonly used parametric representation as discussed in Markel et al., Linear Prediction of Speech, Springer Verlag, New York, 1976. The respective teachings of the Klatt and Markel et al. publications are incorporated herein by this reference.

In the case of client-server based speech synthesis, the parametric representation of speech is received from the network via the wireless channel 105, the wireless data transceiver 203 and the protocol processing block 306, where it is forwarded to the speech synthesis back-end via a fifth data path 313. In the case of local speech synthesis, an application 307 would generate a text string to be spoken. This text string would be passed through the protocol processing block 306 via a sixth data path 314 to a local speech synthesizer 305. The local speech synthesizer 305 converts the test string into a parametric representation of the speech signal and passes this parametric representation via a seventh data path 315 to the speech synthesis back-end 304 for conversion to a speech signal.

It should be noted that the receive data connection 231 can be used to transport other received information in addition to speech synthesis information. For example, the other received information may include data (such as display information) and/or control information received from the infrastructure, and code to be downloaded into the system. Likewise, the transmit data connection 232 can be used to transport other transmit information in addition to the parameter vectors computed by the speech recognition front-end 302. For example, the other transmit information may include device status information, device capabilities, and information related to barge-in timing.

Figure 4:
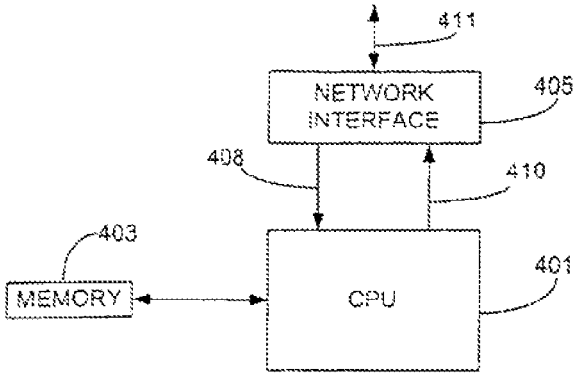
FIG. 4 is a block diagram of a speech recognition server in accordance with the present invention.

Referring now to FIG. 4, there is illustrated a hardware embodiment of a speech recognition server that provides the server portion of the client-server speech recognition and synthesis system in accordance with the present invention. This server can reside in several environments as described above with regard to FIG. 1. Data communication with subscriber units or a control entity enabled through an infrastructure or network connection 411. This connection 411 may be local to, for example, a wireless system and connected directly to a wireless network, as shown in FIG. 1. Alternatively, the connection 411 may be to a public or private data network, or some other data communications link; the present invention is not limited in this regard.

A network interface 405 provides connectivity between a CPU 401 and the network connection 411. The network interface 405 routes data from the network 411 to CPU 401 via a receive path 408, and from the CPU 401 to the network connection 411 via a transmit path 410. As part of a client-server arrangement, the CPU 401 communicates with one or more clients (preferably implemented in subscriber units) via the network interface 405 and the network connection 411. In a preferred embodiment, the CPU 401 implements the server portion of the client-server speech recognition and synthesis system. Although not shown, the server illustrated in FIG. 4 may also comprise a local interface allowing local access to the server thereby facilitating, for example, server maintenance, status checking and other similar functions.

A memory 403 stores machine-readable instructions (software) and program data for execution and use by the CPU 401 in implementing the server portion of the client-server arrangement. The operation and structure of this software is further described with reference to FIG. 5.

Figure 5:
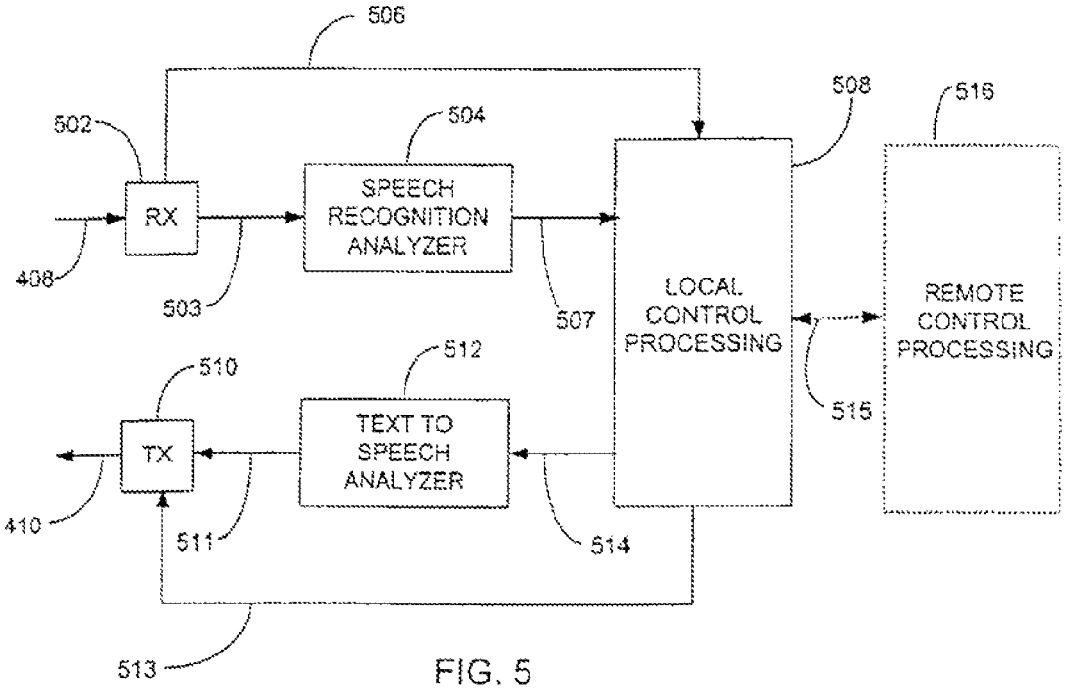
FIG. 5 is a schematic illustration of voice and data processing functionality within a speech recognition server in accordance with the present invention.

FIG. 5 illustrates an implementation of speech recognition and synthesis server functions. Cooperating with at least one speech recognition client, the speech recognition server functionality illustrated in FIG. 5 provides a speech recognition element. Data from a subscriber unit arrives via the receive path 408 at a receiver (RX) 502. The receiver decodes the data and routes speech recognition data 503 from the speech recognition client to a speech recognition analyzer 504. Other information 506 from the subscriber unit, such as device status information, device capabilities, and information related to barge-in context, is routed by the receiver 502 to a local control processor 508. In one embodiment, the other information 506 includes an indication from the subscriber unit that a portion of a speech recognition element (e.g., a speech recognition client) has been activated. Such all indication can be used to initiate speech recognition processing in the speech recognition server.

As part of a client-sever speech recognition arrangement, the speech recognition analyzer 504 takes speech recognition parameter vectors from a subscriber unit and completes recognition, processing. Recognized words or utterances 507 are then passed to the local control processor 508. A description of the processing required to convert parameter vectors to recognized utterances can be found in Lee et al. "Automatic Speech Recognition: The Development of the Sphinx System", 1988, the teachings of which publication are herein incorporated by this reference.

The local control processor 508 receives the recognized utterances 507 from the speech recognition analyzer 504 and other information 508. Generally, the present invention requires a control processor to operate upon the recognized utterances and, based on the recognized utterances, provide control signals. In a preferred embodiment, these control signals are used to subsequently control the operation of a subscriber unit or at least one device coupled to a subscriber unit. To this end, the local control processor may preferably operate in one of two manners. First, the local control processor 508 can implement application programs. One example of a typical application is an electronic assistant as described in U.S. Pat. No. 5,652,789. Alternatively, such applications can run remotely on a remote control processor 516. For example, in the system of FIG. 1, the remote control processor would comprise the control entity 116. In this case, the local control processor 508 operates like a gateway by passing and receiving data by communicating with the remote control processor 516 via a data network connection 515. The data network connection 515 may be a public (e.g., Internet), a private (e.g., Intranet), or some other data communications link. Indeed, the local control processor 508 may communicate with various remote control processors residing on the data network dependent upon the application/service being utilized by a user.

The application program running either on the remote control processor 516 or the local control processor 508 determines a response to the recognized utterances 507 and/or the other information 506. Preferably, the response may comprise a synthesized message and/or control signals. Control signals 513 are relayed from the local control processor 508 to a transmitter (TX) 510. Information 514 to be synthesized, typically text information, is sent from the local control processor 508 to a text-to-speech analyzer 512. The text-to-speech analyzer 512 converts the input text string into a parametric speech representation. A suitable technique for performing such a conversion is described in Sproat (editor), "Multilingual Text-to-Speech Synthesis: The Bell Labs Approach", 1997, the teachings of which publication are incorporated herein by this reference. The parametric speech representation 511 from the text-to-speech analyzer 512 is provided to the transmitter 510 that multiplexes, as necessary, the parametric speech representation 511 and the control information 513 over the transmit path 410 for transmission to a subscriber unit. Operating in the same manner just described, the text-to-speech analyzer 512 may also be used to provide synthesized prompts or the like to be played as an output audio signal at a subscriber unit.

Figure 6:
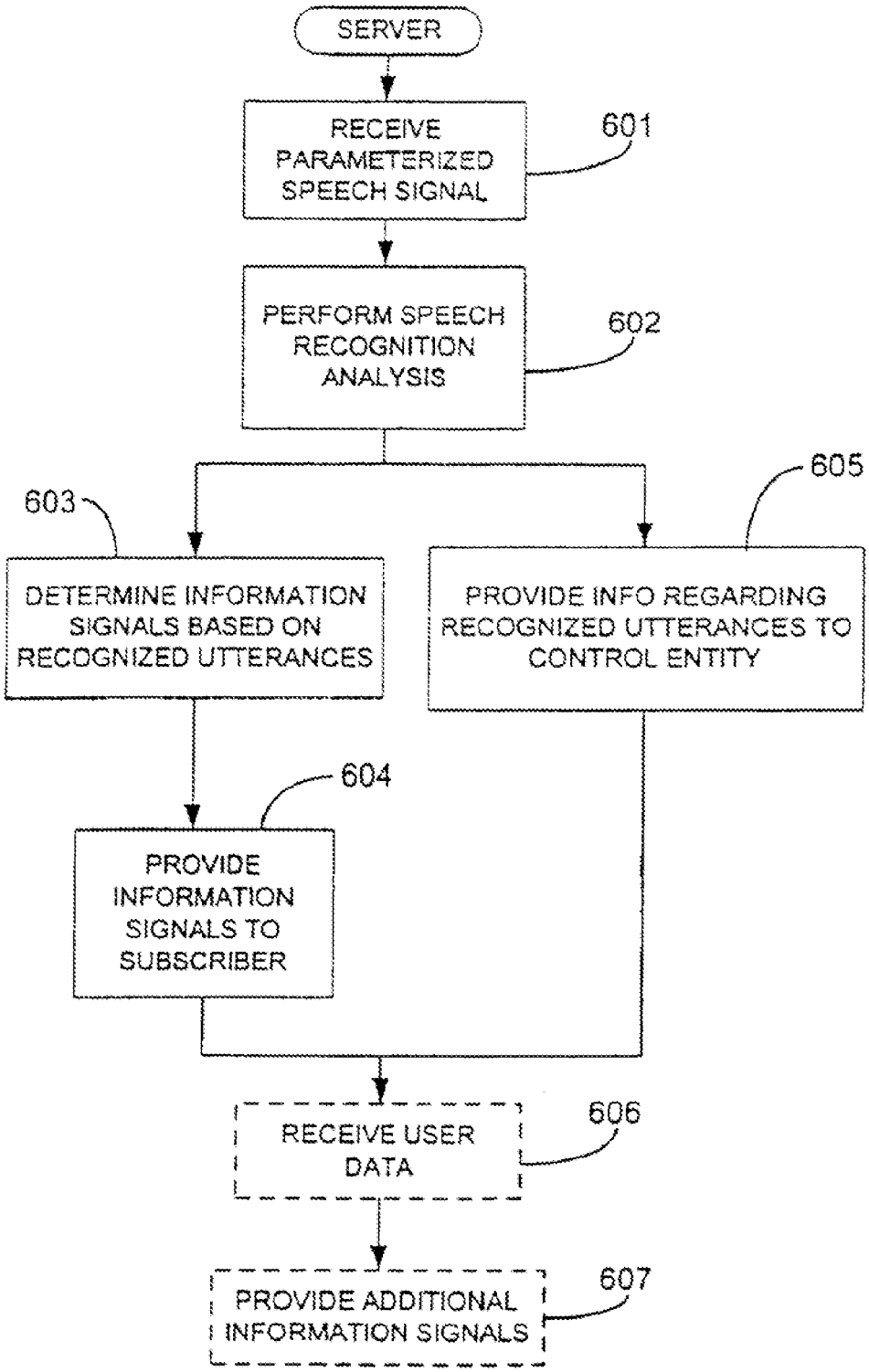
FIG. 6 is a flow chart illustrating operation of a speech recognition server in accordance with the present invention.

Referring now to FIG. 6, there is illustrated a flow chart describing operation of a speech recognition server in accordance with the present invention. At step 601, the speech recognition server receives a parameterized speech signal from a subscriber unit. In practice, the speech recognition server is capable of processing the parameterized speech signals from more than a single subscriber unit and is only limited by the amount of available processing and communication resources. At step 602, the speech recognition server performs speech recognition analysis upon the parameterized speech signals. Assuming favorable circumstances, the speech recognition analysis will provide information regarding recognized utterances detected within the parameterized speech signals.

As noted above, information signals in the context of the instant invention may comprise data signals that may be operated upon by a subscriber unit or devices coupled thereto, or control signals that may be used to control operation of the subscriber unit or its associated devices. In order to provide information signals in response to the recognized utterances, the recognized utterances may be processed in one of two ways. According to the first method, illustrated by steps 603 and 604, the speech recognition server (e.g., through the local control processor 508) first determines information signals based upon the recognized utterances. For example, this could be done through the use of lookup-tables, pattern matching and/or similar mechanisms to correlate a specific recognized utterance or string of utterances to one or more predefined information signals. For example, if the recognized utterances comprise a query regarding a certain party's phone number, the information signal provided in response may comprise that party's phone number ascertained by accessing a data base of phone numbers indexed by names. As another example, if the recognized utterances comprise an instruction to establish a telephone call with a named party, the information signal may comprise the relevant party's phone number, as determined from a data base, and a control signal instructing the subscriber unit to dial the party's phone number, as determined by yet another data base indexed by command content. A large variety of similar scenarios are readily identifiable by those having ordinary skill in the art. Regardless of the method used, the speech recognition server subsequently provides the resulting information signals to the subscriber unit.

In the second method, the speech recognition server, rather than directly determining any control signals, provides the information regarding the recognized utterances to a control entity or remote control processor at step 605. In this manner, the control entity or remote control processor can perform the same processing as described above relative to steps 603, after which processing, the control entity or remote control processor will route the information signals directly to the subscriber unit. Regardless of the method used, the speech recognition server of the present invention facilitates the provision of information signals to subscriber units in wireless communication systems.

Optional steps 606 and 607 are also illustrated in FIG. 6 and describe operations of the speech recognition server (or associated control entity) in response to additional user input. That is, at step 606, user data, provided in response to the information signals, are received from the subscriber unit. In this context, the "user data" may comprise not only a parameterized speech signal; but other input data such as, for example, DTMF tones. This scenario could arise, for example, where a user originally requests a party's phone number by name. If, however, ambiguity exists because of multiple parties having the same name, the information signals provided in response may request the user to select one of the parties through use of a touch-tone pad (i.e., using DTMF tones) or by responding to the name of one of the parties. The data selecting a particular party in this case would be the user data. Again, a wide variety of situations encompassing such functionality will be readily apparent to the reader. In response to the user data, additional information signals, again comprising data and/or control signals, may be provided at step 607. Referring to the previous example, the additional information signals would comprise the phone number of the selected party and, possibly, a control signal instructing the subscriber unit to dial the phone number.

Figure 7:
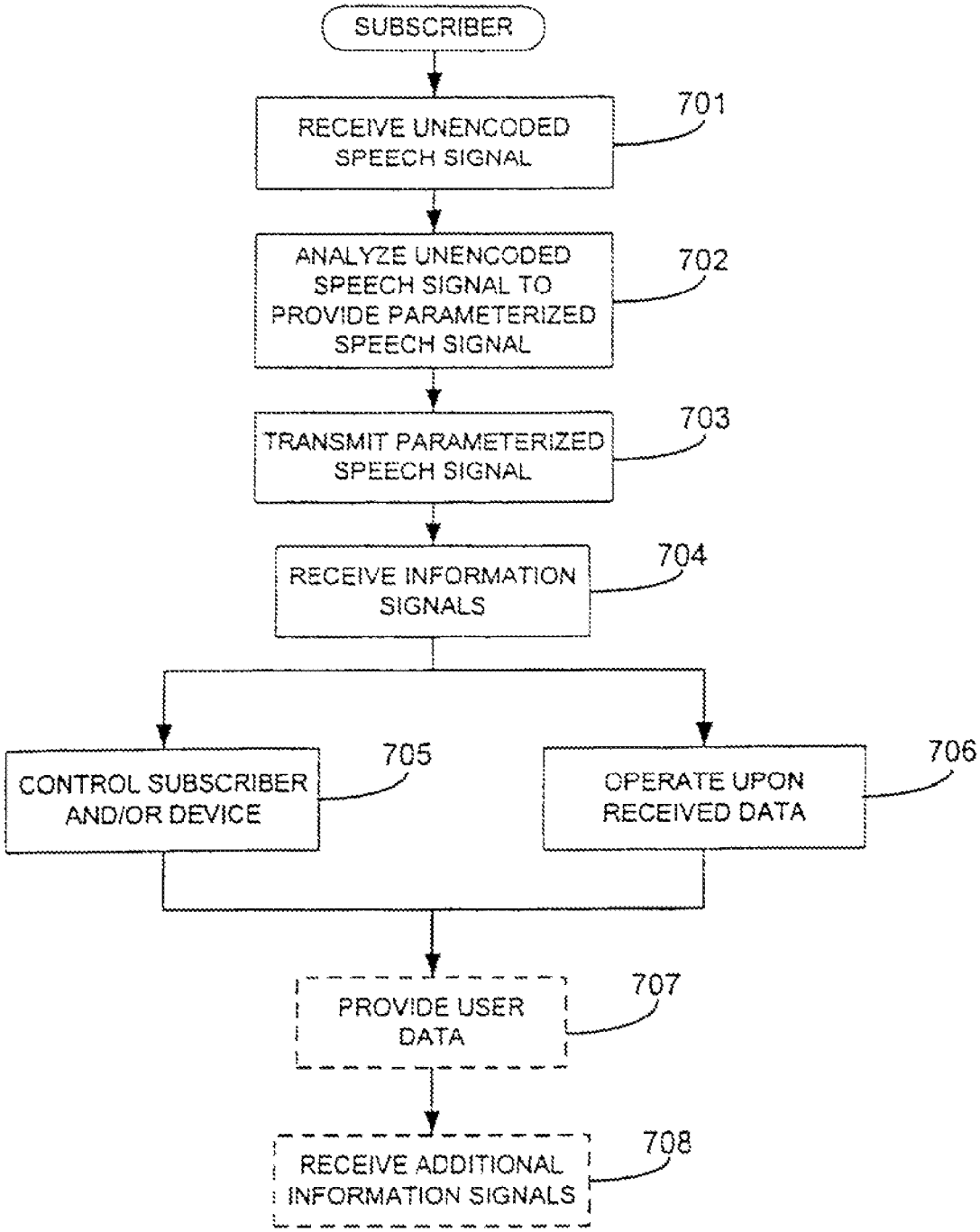
FIG. 7 is a flow chart illustrating operation of a subscriber unit in accordance with the present invention.

Referring now to FIG. 7, there is illustrated a flow chart describing operation of a subscriber unit in accordance with the present invention. At step 701, the subscriber unit receives an unencoded speech signal. Preferably, the unencoded speech signal is digitally represented or converted to a digital representation prior to additional processing. At step 702, in accordance with the techniques described above, the unencoded speech signal is analyzed to provide a parameterized speech signal. The parameterized speech signal is then transmitted at step 703 to a speech recognition server, where, in accordance with the processing steps illustrated in FIG. 6 and described above, information signals are ascertained, if possible.

At step 704, the subscriber unit receives the information signals, if any, which are based upon the parameterized speech signal. Consequently, at steps 705 and 706, the information signals are operated upon by, or used to control operation of, the subscriber unit itself or any devices coupled to the subscriber unit, as might be the case with an in-vehicle system. It should be noted that when the information signals comprise data, the data can be used to locally generate (i.e., at the subscriber unit) control signals. For example, receipt of a phone number from the infrastructure can be used to trigger a control signal instructing the subscriber unit to dial the phone number. Alternatively, receipt of a voice prompt to be rendered audible may cause the generation of a control signal instructing a stereo coupled to the subscriber unit to reduce the volume of, or mute altogether, its current audio output. Other examples incorporating such functionality are readily identifiable.

Furthermore, optional steps 707 and 708 correspond to, and are the complement of, steps 606 and 607 described above. In particular, at step 707, the subscriber unit provides user data to the infrastructure (i.e., the speech recognition server and/or a control entity). Again, the user data provided of step 707 is responsive to the previously received information signals. At step 708, the subscriber unit receives additional information signals, comprising data and/or control signals, from the infrastructure, which control signals may be operated upon or used to control the subscriber unit or any devices coupled to the subscriber unit.

The present invention as described above provides a unique technique for providing control signals to subscriber units in a wireless communication system. Relying in part upon a client-server speech recognition arrangement, the present invention provides an efficient method for supplying information signals to subscriber units. As a result, the present invention can be used to enable services. What has been described above is merely illustrative of the application of the principles of the present invention. Other arrangements and methods can be implemented by those skilled in the art without departing from the spirit and scope of the present invention.

What is claimed is:

[1. In a speech recognition server forming a part of an infrastructure that wirelessly communicates with one or more subscriber units, each of the one or more subscriber units comprising a speech recognition client, a method for providing information signals to a subscriber unit of the one or more subscriber units, the method comprising steps of:

receiving a parameterized speech signal, produced by the speech recognition client, from the subscriber unit;

performing speech recognition analysis on the parameterized speech signal to provide recognized utterances;

determining information signals based on the recognized utterances; and responsive to the recognized utterances, providing the information signals to the subscriber unit.]

2. The method of claim [1] *6*, wherein the speech recognition client, based on an unencoded speech signal input to the subscriber unit, provides the parameterized speech signal.

3. The method of claim [1] *6*, the step of providing the information signals further comprising a step of:

directing the information signals to the subscriber unit, wherein the information signals control operation of the subscriber unit.

4. The method of claim [1] *6*, wherein the subscriber unit is coupled to at least one device, the step of providing the information signals further comprising a step of:

directing the information signals to the at least one device, wherein the information signals control operation of the at least one device.

[5. The method of claim 1, the step of providing the information signals further comprising a step of:

directing the information signals to the subscriber unit, wherein the subscriber unit operates upon the information signals.]

6. [The method of claim 5, further comprising steps of:] *In a speech recognition server forming a part of an infrastructure that wirelessly communicates with one or more subscriber units, each of the one or more subscriber units comprising a speech recognition client, a method for providing information signals to a subscriber unit of the one or more subscriber units, the method comprising steps of:*

*receiving a parameterized speech signal, produced by the speech recognition client, from the subscriber unit;*

*performing speech recognition analysis on the parameterized speech signal to provide recognized utterances;*

*determining information signals based on the recognized utterances;*

*responsive to the recognized utterances, providing the information signals to the subscriber unit, the step of providing the information signals further comprising a step of: directing the information signals to the subscriber unit, wherein the subscriber unit operates upon the information signals;* receiving user data in response to the information signals from the subscriber unit; and responsive to the user data, providing additional information signals to the subscriber unit.

7. The method of claim [1] *6*, wherein the subscriber unit is coupled to at least one device, the step of providing the information signals further comprising a step of:

directing the information signals to the at least one device, wherein the at least one device operates upon the information signals.

[8. The method of claim 7, further comprising steps of:

receiving user data in response to the information signals from the subscriber unit; and responsive to the user data, providing, additional information signals to the subscriber unit.]

9. A *non-transitory* computer-readable medium having computer-executable instructions for performing the steps recited in claim [1] *6*.

10. In a speech recognition server forming a part of an infrastructure that wirelessly communicates with one or more subscriber units, each of the one or more subscriber units comprising a speech recognition client, a method for providing information signals to a subscriber unit of the one or more subscriber units, the method comprising steps of:

receiving a parameterized speech signal from the subscriber unit, the parameterized speech signal being output by the speech recognition client;

performing speech recognition analysis on the parameterized speech signal to provide recognized utterances; [and]

providing information regarding the recognized utterances to control entity forming a part of the infrastructure, wherein the control entity provides the information signals to the subscriber unit based on the information regarding the recognized utterances*, wherein the subscriber unit operates upon the information signals;*

*receiving user data from the subscriber unit in response to the information signals; and*

*responsive to the user data, providing additional information signals to the subscriber unit*.

11. The method of clam 10, wherein the speech recognition client, based on an unencoded speech signal input to the subscriber unit, provides the parameterized speech signal.

12. A *non-transitory* computer-readable medium having computer-executable instructions for performing the steps recited in claim 10.

[13. In a subscriber unit that wirelessly communicates with an infrastructure, the subscriber unit comprising a speech recognition client and the infrastructure comprising a speech recognition server, a method for providing information signals to the subscriber unit:

receiving, by the speech recognition client, an unencoded speech signal;

analyzing, by the speech recognition client, the unencoded speech signal to provide a parameterized speech signal;

transmitting, by the subscriber unit, the parameterized speech signal to the speech recognition server; and receiving, by the subscriber unit from the infrastructure, the information signals based on the parameterized speech signals.]

14. The method of claim [13] *19*, further comprising a step of: using the information signals to control operation of the subscriber unit.

15. The method of claim [13] *19*, further comprising a step of:

based on the information signals, locally generating control signals for controlling operation of any of the subscriber unit and at least one device coupled to the subscriber unit.

16. The method of claim [13] *19*, wherein the subscriber unit is coupled to at least one device, further comprising a step of:

using the information signals to control operation of the at least one device.

17. The method of claim 16, wherein the subscriber unit is coupled to the at least one device via an automobile-based communication path and the information signals are provided to the at least one device via the automobile-based communication path.

[18. The method of claim 13, further comprising a step of: operating upon the information signals.]

19. [The method of claim 18, further comprising steps of:] *In a subscriber unit that wirelessly communicates with an infrastructure, the subscriber unit comprising a speech recognition client and the infrastructure comprising a speech recognition server, a method for providing information signals to the subscriber unit:*

*receiving, by the speech recognition client, an unencoded speech signal;*

*analyzing, by the speech recognition client, the unencoded speech signal to provide a parameterized speech signal;*

*transmitting, by the subscriber unit, the parameterized speech signal to the speech recognition server;*

*receiving, by the subscriber unit from the infrastructure, the information signals based on the parameterized speech signal;*

*operating upon the information signals;* providing user data in response to the information signals to the infrastructure; and responsive to the user data, receiving additional information signals from the infrastructure.

20. The method of claim [13] *19*, wherein the subscriber unit is coupled to at least one device, further comprising a step of:

operating, by the at least one device, upon the information signals.

[21. The method of claim 20, further comprising steps of:

providing user data in response to the information signals to the infrastructure; and responsive to the user data, providing additional information signals from the infrastructure.]

22. The method of claim [13] *19*, wherein the information signals are provided by the speech recognition server.

23. The method of claim [13] *19*, wherein the information signals are provided by a control entity forming a part of the infrastructure and coupled to the speech recognition server.

24. A *non-transitory* computer-readable medium having computer-executable instructions for performing the steps recited in claim [13] *19*.

[25. In a wireless communications system comprising one or more subscriber units in wireless communication with an infrastructure, each of the one or more subscriber units comprising a speech recognition client and the infrastructure comprising a speech recognition server, a method for providing information signals to a subscriber unit of the one or more subscriber units, the method comprising steps of:

receiving, by the speech recognition client, an unencoded speech signal;

analyzing, by the speech recognition client, the unencoded speech signal to provide a parameterized speech signal;

transmitting, by the subscriber unit, the parameterized speech signal to the speech recognition server;

performing, by the speech recognition server, speech recognition analysis on the parameterized speech signal to provide recognized utterances;

determining, by the speech recognition server, the information signals based on the recognized utterances; and responsive to the recognized speech utterances, providing, by the infrastructure, the information signals to the subscriber unit.]

26. The method of claim [25] *31*, further comprising a step of:

based on the information signals, locally generating, by the subscriber unit, control signals for controlling operation of any of the subscriber unit and at least one device coupled to the subscriber unit.

27. The method of claim [25] *31*, the step of providing the information signals further comprising a step of:

directing the information signals to the subscriber unit, wherein the information signals control operation of the subscriber unit.

28. The method of claim [25] *31*, wherein the subscriber unit is coupled to at least one device, the step of providing the information signals further comprising a step of:

directing the information signals to the at least one device, wherein the information signals control operation of the at least one device.

29. The method of claim 28, wherein the subscriber unit is coupled to the at least one device via an automobile-based communication path and the information signals are provided to the at least one device via the automobile-based communication path.

[30. The method of claim 25, the step of providing the information signals further comprising a step of:

directing the information signals to the subscriber unit, wherein the subscriber unit operates upon the information signals.]

31. [The method of claim 30, further comprising steps of:] *In a wireless communications system comprising one or more subscriber units in wireless communication with an infrastructure, each of the one or more subscriber units comprising a speech recognition client and the infrastructure comprising a speech recognition server, a method for providing information signals to a subscriber unit of the one or more subscriber units, the method comprising steps of:*

*receiving, by the speech recognition client, an unencoded speech signal;*

*analyzing, by the speech recognition client, the unencoded speech signal to provide a parameterized speech signal;*

*transmitting, by the subscriber unit, the parameterized speech signal to the speech recognition server;*

*performing, by the speech recognition server, speech recognition analysis on the parameterized speech signal to provide recognized utterances;*

*determining, by the speech recognition server, the information signals based on the recognized utterances;*

*responsive to the recognized speech utterances, providing, by the infrastructure, the information signals to the subscriber unit, the step of providing the information signals further comprising a step of: directing the information signals to the subscriber unit, wherein the subscriber unit operates upon the information signals;* receiving, by the infrastructure, user data in response to the information signals from the subscriber unit; and responsive to the user data, providing, by the infrastructure, additional information signals to the subscriber unit.

32. The method of claim [25] *31*, wherein the subscriber unit is coupled to at least one device, the step of providing the information signals further comprising a step of:

directing the information signals to the at least one device, wherein the at least one device operates upon the information signals.

[33. The method of claim 32, further comprising steps of:

receiving, by the infrastructure, user data in response to the information signals from the subscriber unit; and responsive to the user data, providing, by the infrastructure, additional information signals to the subscriber unit.]

34. The method of claim [25] *31*, wherein the information signals are provided by the speech recognition server.

35. The method of claim [25] *31*, wherein the information signals are provided by a control entity forming a part of the infrastructure and coupled to the speech recognition server.

36. A *non-transitory* computer-readable medium having computer-executable instructions for performing the steps recited in claim [25] *31*.

37. A speech recognition server for use in an infrastructure of a wireless communication system, wherein the infrastructure wirelessly communicates with one or more subscriber units, the speech recognition server comprising:

a receiver that takes as input signals regarding a parameterized speech signal output by a subscriber unit of the one or more subscriber units and provides as output the parameterized speech signal;

a speech recognition analyzer, coupled to the receiver, that performs speech recognition analysis on the parameterized speech signal to provide recognized utterances; and a transmitter, coupled to the speech recognition analyzer, that provides information regarding the recognized utterances to a control entity forming a part of the infrastructure, wherein the control entity provides information signals, based on the information regarding the recognized utterances, to the subscriber unit, *wherein the subscriber unit operates upon the information signals, wherein the receiver further takes user data in response*

*to the information signals from the subscriber unit, and wherein the transmitter, responsive to the user data, further provides additional information signals to the subscriber unit.*

38. A wireless communication system comprising the speech recognition server in accordance with claim 37, wherein the speech recognition server is resident in any one of a group of locations comprising a user's workspace, an enterprise's network, and a public network.

39. A speech recognition server for use in an infrastructure, wherein the infrastructure wirelessly communicates with one or more [subscribe] *subscriber* units, the speech recognition server comprising:

a receiver that takes as input signals regarding a parameterized speech signal output by a subscriber unit of the one or more subscriber units and provides as output the parameterized speech signal;

a speech recognition analyzer, coupled to the receiver, that performs speech recognition analysis on the parameterized speech signal to provide recognized utterances;

a control processor that takes as input the recognized utterances and provides information signals based on the recognized utterances; and a transmitter, coupled to the control processor, that provides the information signals to the subscriber unit of the one or more [subscribe] *subscriber* units*, wherein the one or more subscriber units operate upon the information signals, wherein the receiver further takes user data in response to the information signals from the one or more subscriber units, and wherein the transmitter, responsive to the user data, further provides additional information signals to the one or more subscriber units*.

40. A wireless communication system comprising the speech recognition server in accordance with claim 39, wherein the speech recognition server is resident in any one of a group of locations comprising a user's workspace, an enterprise's network, and a public network.

[41. A subscriber unit that wirelessly communicates with an infrastructure, the subscriber unit comprising:

a speech recognition client that takes as input an unencoded speech signal and analyzes that unencoded speech signal to provide a parameterized speech signal;

a transmitter, coupled to the speech recognition client, that wirelessly communicates the parameterized speech signal to the infrastructure; and a receiver that takes as input signals regarding information signals and provides the information signals as output, wherein the information signals are generated by a speech recognition server residing in the infrastructure and are based on the parameterized speech signal.]

42. The subscriber unit of claim [41] *47*, further comprising:

means, coupled to the receiver, for coupling the subscriber unit to at least one device, wherein the information signals are used to control operation of the at least one device.

43. The subscriber unit of claim 42, wherein the means for coupling comprises an automobile-based communication path.

44. The subscriber unit of claim [41] *47*, wherein the information signals are used to control operation of the subscriber unit.

45. The subscriber unit of claim [41] *47*, further comprising:

means, based on the information signals, for locally generating control signals for controlling operation of any of the subscriber unit and at least one device coupled to the subscriber unit.

[46. The subscriber unit of claim 41, wherein the information signals are operated upon by the subscriber unit.]

47. [The subscriber unit of claim 46] *A subscriber unit that wirelessly communicates with an infrastructure, the subscriber unit comprising:*

*a speech recognition client that takes as input an unencoded speech signal and analyzes that unencoded speech signal to provide a parameterized speech signal;*

*a transmitter, coupled to the speech recognition client, that wirelessly communicates the parameterized speech signal to the infrastructure; and*

*a receiver that takes as input signals regarding information signals and provides the information signals as output, wherein the information signals are generated by a speech recognition server residing in the infrastructure and are based on the parameterized speech signal, wherein the information signals are operated upon by the subscriber unit*, wherein the transmitter further functions to provide, to the infrastructure, user data in response to the information signals, and wherein the receiver further functions to receive, responsive to the user data, additional information signals from the infrastructure.

48. The subscriber unit of claim [41] *47*, further comprising:

means, coupled to the receiver, for coupling the subscriber unit to at least one device, wherein the at least one device operates upon the information signals.

[49. The subscriber unit of claim 48, wherein the transmitter further functions to provide, to the infrastructure, user data in response to the information signals, and wherein the receiver further functions to receive, responsive to the user data, additional information signals from the infrastructure.]

50. The subscriber unit of claim 48, wherein the means for coupling comprises an automobile-based communication path.

* * * * *